United States Patent
Hane

(10) Patent No.: US 7,394,824 B2
(45) Date of Patent: Jul. 1, 2008

(54) SYSTEM AND METHOD OF TRANSMITTING VARIABLE LENGTH PACKET BY SEQUENTIAL ALLOCATION OF PERMISSION AND MONITORING RESPONSE DETECTION TIME PERIOD

(75) Inventor: Toshihisa Hane, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 950 days.

(21) Appl. No.: 10/145,897

(22) Filed: May 16, 2002

(65) Prior Publication Data

US 2003/0103522 A1 Jun. 5, 2003

(30) Foreign Application Priority Data

Dec. 5, 2001 (JP) ............................. 2001-371036

(51) Int. Cl.
*H04J 3/16* (2006.01)
(52) U.S. Cl. ..................... 370/437; 370/458; 370/468; 370/477; 398/35; 398/52
(58) Field of Classification Search ................. 370/235, 370/412, 413, 415, 417, 428, 433, 468, 437, 370/444, 458, 477, 537; 398/23, 35, 52, 398/69
See application file for complete search history.

(56) References Cited

U.S. PATENT DOCUMENTS

| | | | | |
|---|---|---|---|---|
| 4,486,829 A | * | 12/1984 | Mori et al. | 714/34 |
| 4,855,998 A | * | 8/1989 | Kishimoto | 370/452 |
| 6,002,680 A | | 12/1999 | Sierens et al. | 370/344 |
| 6,704,932 B1 | * | 3/2004 | Matsunaga et al. | 725/126 |
| 6,735,211 B1 | * | 5/2004 | Karasawa | 370/412 |
| 6,738,578 B1 | * | 5/2004 | Mihota | 398/22 |
| 2002/0006111 A1 | * | 1/2002 | Akita et al. | 370/235 |

FOREIGN PATENT DOCUMENTS

| | | |
|---|---|---|
| JP | 64-72697 | 3/1989 |
| JP | 1-192239 | 8/1989 |
| JP | 4-260243 | 9/1992 |
| JP | 6-315043 | 11/1994 |
| JP | 7-283827 | 10/1995 |
| JP | 10-70756 | 3/1998 |
| JP | 10-215268 | 8/1998 |
| JP | 10-334025 | 12/1998 |

(Continued)

*Primary Examiner*—Chi Pham
*Assistant Examiner*—Shick Hom
(74) *Attorney, Agent, or Firm*—Oblon, Spivak, McClelland, Maier & Neustadt, P.C.

(57) ABSTRACT

In a system including a parent station and a plurality of child stations connected only to the parent station, which is unable to detect a response among the plurality of child stations, the parent station includes a transmission permission sequential allocation mechanism for giving transmission permission sequentially and a first timer for monitoring a first period which is a response detection time period. The child station includes a transmission permission detection mechanism for detecting that the identifier sent by the parent station is directed to the own station. Each of the child stations transmits data in a band period when the child station is permitted to communicate. When the parent station does not receive a response from the child station permitted to communicate within the first period, the parent station permits a next child station to communicate.

19 Claims, 12 Drawing Sheets

FOREIGN PATENT DOCUMENTS

| | | |
|---|---|---|
| JP | 11-98151 | 4/1999 |
| JP | 11-266277 | 9/1999 |
| JP | 2000-357139 | 12/2000 |
| JP | 2001-111554 | 4/2001 |
| JP | 2001-111588 | 4/2001 |

\* cited by examiner

Fig. 7

CHILD STATION DATA TRANSMISSION ALLOCATION TABLE
9c

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 17 | 18 | 19 | 20 | 21 | 22 | 23 | 24 | 25 | 26 | 27 | 28 | 29 | 30 | 31 | 32 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 9 | 10 | 11 | 12 | 13 | 14 | 15 | 16 |
| 17 | 18 | 19 | 20 | 21 | 22 | 23 | 24 | 25 | 26 | 27 | 28 | 29 | 30 | 31 | 32 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |

← CHILD STATION ID:1~32

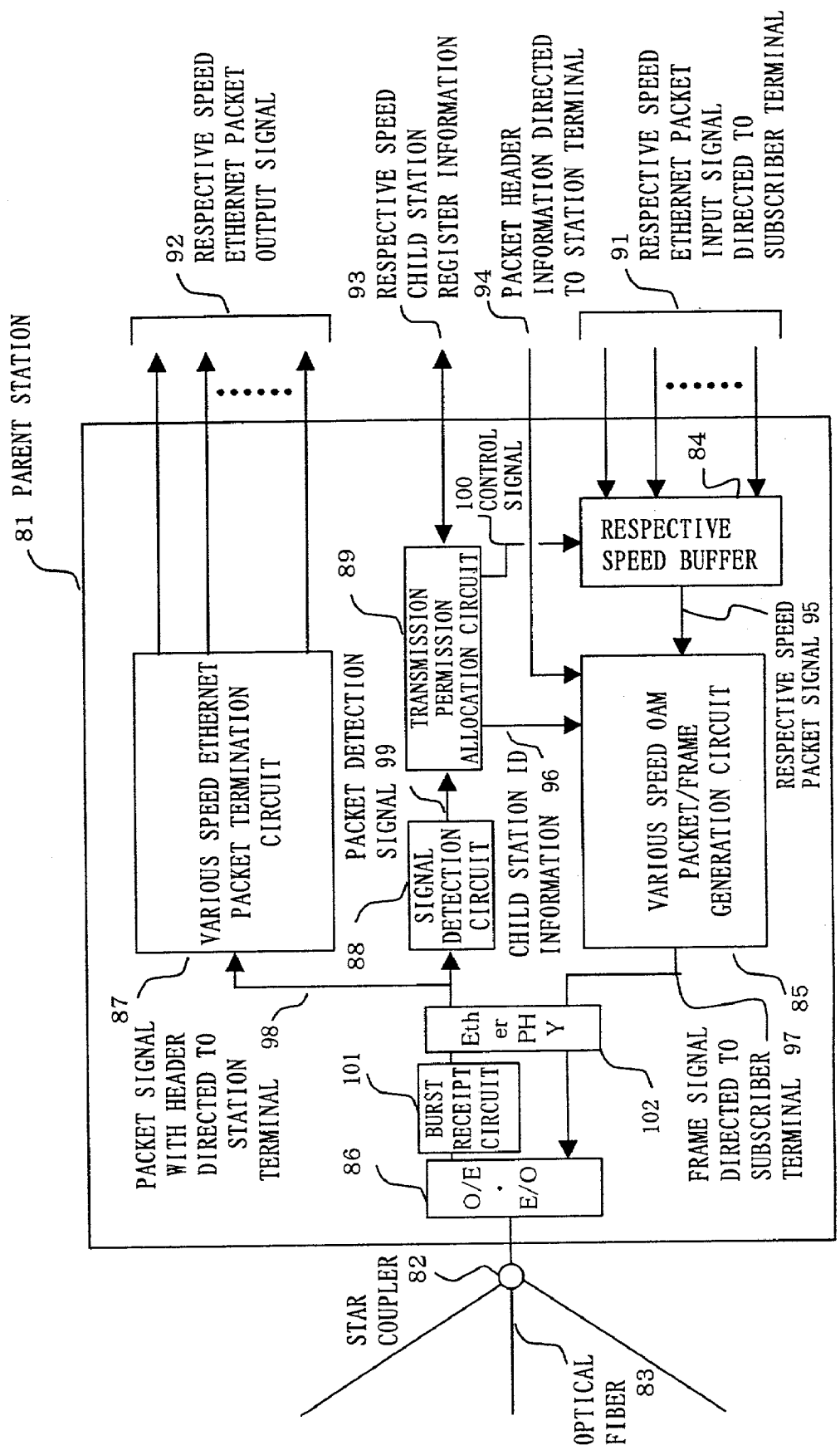

Fig. 9

CHILD STATION DATA TRANSMISSION ALLOCATION TABLE

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 17 | 18 | 19 | 20 | 21 | 22 | 23 | 24 | 25 | 26 | 27 | 28 | 29 | 30 | 31 | 32 |
| 1 | 2 | 3 | 4 | 5 | 6 | 7 | 8 | 1 | 2 | 3 | 4 | 1 | 2 | 3 | 4 |
| 1 | 2 | 3 | 4 | 1 | 2 | 3 | 4 | 1 | 2 | 3 | 4 | 1 | 2 | 3 | 4 |
| 1 | 2 | 1 | 2 | 1 | 2 | 1 | 2 | 1 | 2 | 1 | 2 | 1 | 2 | 1 | 2 |
| 2 | 2 | 2 | 2 | 2 | 2 | 2 | 2 | 2 | 2 | 2 | 2 | 2 | 2 | 2 | 2 |
| 1 | 2 | 3 | 4 | 5 | 6 | 7 | 8 | 9 | 10 | 11 | 12 | 13 | 14 | 15 | 16 |
| 17 | 18 | 19 | 20 | 21 | 22 | 23 | 24 | 25 | 26 | 27 | 28 | 29 | 30 | 31 | 32 |
| 1 | 2 | 3 | 4 | 5 | 6 | 7 | 8 | 1 | 2 | 3 | 4 | 1 | 2 | 3 | 4 |
| 1 | 2 | 3 | 4 | 1 | 2 | 3 | 4 | 1 | 2 | 3 | 4 | 1 | 2 | 3 | 4 |
| 1 | 1 | 1 | 1 | 1 | 1 | 1 | 1 | 1 | 1 | 1 | 1 | 1 | 1 | 1 | 1 |

CHILD STATION ID: 1～32

- MINIMUM BAND ASSURANCE AREA
- BEST EFFORT AREA
- MINIMUM BAND ASSURANCE AREA
- BEST EFFORT AREA

MINIMUM BAND ASSURANCE AREA・・ALLOCATE TRANSMISSION RIGHT TO ALL CHILD STATIONS
BEST EFFORT AREA・・ALLOCATE TRANSMISSION RIGHT TO A CHILD STATION WHICH SENT A USER PACKET WHEN THE TRANSMISSION RIGHT WAS ALLOCATED BEFORE

Fig. 10

CHILD STATION DATA TRANSMISSION ALLOCATION TABLE

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 17 | 18 | 19 | 20 | 21 | 22 | 23 | 24 | 25 | 26 | 27 | 28 | 29 | 30 | 31 | 32 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 9 | 10 | 11 | 12 | 13 | 14 | 15 | 16 |
| 17 | 18 | 19 | 20 | 21 | 22 | 23 | 24 | 25 | 26 | 27 | 28 | 29 | 30 | 31 | 32 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |
| 1 | 2 | 3 | 4 | 5 | 6 | 7 | 8 | 1 | 2 | 3 | 4 | 5 | 6 | 7 | 8 |

CHILD STATION ID: 1~32

EQUAL SERVICE GRADE AREA
HIGH SPEED SERVICE GRADE AREA
EQUAL SERVICE GRADE AREA
HIGH SPEED SERVICE GRADE AREA

EQUAL SERVICE GRADE AREA · · ALLOCATE TRANSMISSION RIGHT TO BOTH CHILD STATIONS OF HIGH SPEED SERVICE AND CHILD STATIONS OF LOW SPEED SERVICE
HIGH SPEED SERVICE GRADE AREA · · ALLOCATE TRANSMISSION RIGHT ONLY TO CHILD STATIONS OF HIGH SPEED SERVICE

Fig. 11

CHILD STATION DATA TRANSMISSION ALLOCATION TABLE

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | HIGH | HIGH | HIGH | HIGH | HIGH | HIGH | HIGH | HIGH | HIGH | HIGH | HIGH | HIGH | HIGH | HIGH | HIGH | HIGH |
| | 17 | 18 | 19 | 20 | 21 | 22 | 23 | 24 | 25 | 26 | 27 | 28 | 29 | 30 | 31 | 32 |
| | HIGH | HIGH | HIGH | HIGH | HIGH | HIGH | HIGH | HIGH | HIGH | HIGH | HIGH | HIGH | HIGH | HIGH | HIGH | HIGH |
| | 1 | 2 | 3 | 4 | 5 | 6 | 7 | 8 | 9 | 10 | 11 | 12 | 13 | 14 | 15 | 16 |
| | LOW | LOW | LOW | LOW | LOW | LOW | LOW | LOW | LOW | LOW | LOW | LOW | LOW | LOW | LOW | LOW |
| | 17 | 18 | 19 | 20 | 21 | 22 | 23 | 24 | 25 | 26 | 27 | 28 | 29 | 30 | 31 | 32 |
| | LOW | LOW | LOW | LOW | LOW | LOW | LOW | LOW | LOW | LOW | LOW | LOW | LOW | LOW | LOW | LOW |
| | 1 | 2 | 3 | 4 | 5 | 6 | 7 | 8 | 9 | 10 | 11 | 12 | 13 | 14 | 15 | 16 |
| | HIGH | HIGH | HIGH | HIGH | HIGH | HIGH | HIGH | HIGH | HIGH | HIGH | HIGH | HIGH | HIGH | HIGH | HIGH | HIGH |
| | 17 | 18 | 19 | 20 | 21 | 22 | 23 | 24 | 25 | 26 | 27 | 28 | 29 | 30 | 31 | 32 |
| | HIGH | HIGH | HIGH | HIGH | HIGH | HIGH | HIGH | HIGH | HIGH | HIGH | HIGH | HIGH | HIGH | HIGH | HIGH | HIGH |
| | 1 | 2 | 3 | 4 | 5 | 6 | 7 | 8 | 9 | 10 | 11 | 12 | 13 | 14 | 15 | 16 |
| | LOW | LOW | LOW | LOW | LOW | LOW | LOW | LOW | LOW | LOW | LOW | LOW | LOW | LOW | LOW | LOW |
| | 17 | 18 | 19 | 20 | 21 | 22 | 23 | 24 | 25 | 26 | 27 | 28 | 29 | 30 | 31 | 32 |
| | LOW | LOW | LOW | LOW | LOW | LOW | LOW | LOW | LOW | LOW | LOW | LOW | LOW | LOW | LOW | LOW |

← CHILD STATION ID:1~32

HIGH PRIORITY PACKET TRANSMISSION AREA

BOTH PACKET TRANSMISSION AREA

HIGH PRIORITY PACKET TRANSMISSION AREA

BOTH PACKET TRANSMISSION AREA

HIGH PRIORITY PACKET TRANSMISSION AREA: ・PERMIT TRANSMISSION OF HIGH PRIORITY PACKET AND ALLOCATE TRANSMISSION RIGHT TO CHILD STATION
BOTH PACKET TRANSMISSION AREA: ・PERMIT TRANSMISSION OF HIGH PRIORITY PACKET AND LOW PRIORITY PACKET AND ALLOCATE TRANSMISSION RIGHT TO CHILD STATION

SYSTEM AND METHOD OF TRANSMITTING VARIABLE LENGTH PACKET BY SEQUENTIAL ALLOCATION OF PERMISSION AND MONITORING RESPONSE DETECTION TIME PERIOD

BACKGROUND OF THE INVENTION

1. Field of the Invention

This invention relates to a transmission equipment including an interface for transmitting ETHERNET (trade mark) packet data in LAN (Local Area Network), etc. as a user network interface (UNI). Particularly, this invention relates to a transmission equipment for transmitting variable length ETHERNET packet data in a PON (Passive Optical Network).

2. Description of the Related Art

A PON system according to the related art is explained.

FIG. 12 shows a block configuration chart for explaining an optical communication equipment, its communication method and a system in which its control program is written disclosed in Japanese Unexamined Published Patent Application Hei 11-98151.

In FIG. 12, the optical communication equipment includes a station equipment 111 and a subscriber equipment 113. The station equipment 111 is connected to an external work station 112, and the subscriber equipment 113 is connected to a terminal 114.

The station equipment 111 has a function for changing band (band period or time band or time period) allocations dynamically. By this function, an unutilized band is shared among a plurality of subscribers who are members of band unassurance service instead of band assurance service for communications with the station equipment 111 in the PON system.

In this configuration, the subscriber equipment 113 includes a PDS (Passive Double Star) terminator 131 for terminating an interface with the station equipment 111, a terminal interface terminator 133 for terminating an interface with the terminal for the band unassurance service in a user side, a memory 132 for storing packet data which are converted between the PDS terminator 131 and the terminal interface terminator 133, and a memory controller 134 for measuring a stored data amount in the memory 132 and sending a request for transmission to the PDS terminator 131 when it is necessary to send a signal to the station equipment through the PDS terminator 131.

Meanwhile, the station equipment 111 includes a PDS terminator 121 for terminating an interface with the subscriber equipment 113, a controller 125 for terminating an interface with the external work station 112, which sends control information, and for distributing necessary control information to each of function blocks in the equipment, a subscriber information storing unit 124 for storing information on a subscriber who has applied to use a shared band (band period) in the control information received from the controller 125, a packet analyzer 123 for receiving the information on the subscriber from the subscriber information storing unit 124 and sending subscriber ID (Identification Data) and a polling instruction to the PDS terminator 121, and a time division switch (TSW) 122.

Operations of this system are explained.

The packet analyzer 123 sends the subscriber ID and the polling instruction to the PDS terminator 121, and receives a transmission request 151 and the subscriber ID from the concerning subscriber equipment 113. When the packet analyzer 123 receives the transmission request from the subscriber, the packet analyzer 123 sends a transmission permission signal 152 to the concerning subscriber equipment 113 queuing to transmit to the station equipment in the shared band period. Then, the packet analyzer 123 receives a packet signal returned from the subscriber equipment 113.

The packet analyzer 123 analyzes a packet length signal written in a packet overhead (LLC (Logical Link Control) part) in a first packet signal received from the subscriber equipment 113, and determines a time period to be occupied by the concerning subscriber equipment 113 based on the packet length. Then, the packet analyzer 123 sends the transmission permission signal 152 to the subscriber equipment 113 indicating the time period to be occupied, and receives a packet signal from the subscriber equipment 113.

The PON system according to the related art is configured as above stated. When a parent station allocates bands (band periods) for transmission directed to the station terminal to a plurality of child stations, the parent station sends subscriber ID information and polling instruction information to an arbitrary child station, and receives transmission request information and subscriber ID information from the concerning subscriber equipment. Further, when the parent station receives the transmission request information, the parent station sends the transmission permission signal to the concerning subscriber equipment, and receives the packet signal from the concerning subscriber equipment sequentially. Further, the packet analyzer in the parent station analyzes the packet length signal written in the packet overhead (LLC part) in the first packet signal received from the subscriber equipment, and determines the time period to be occupied by the concerning subscriber equipment based on the packet length. Then, the parent station sends the transmission permission signal indicating the time period to be occupied, and receives the packet signal from the subscriber equipment. As stated, complex processing is necessary in the system according to the related art.

SUMMARY OF THE INVENTION

It is one of objects of this invention to solve the above-stated problem. The complex processing of controlling the transmission sequentially by polling becomes unnecessary. According to this invention, a system and a method for controlling the allocations to the child stations in a short time can be realized in a simple configuration.

According to an aspect of this invention, a packet communication system has a parent station and a plurality of child stations connected only to the parent station, which is unable to detect a response among each other, and transmits data in a band period. The packet communication system includes a first timer for monitoring a first period which is a response detection period in the parent station, and a transmission allocation circuit for setting an identifier of a child station permitted to transmit during the first period and informing the child station permitted, and for setting a next identifier of a next child station unless receiving a response in the parent station.

According to another aspect of this invention, a packet communication method in a system having a parent station and a plurality of child stations connected only to the parent station, which is unable to detect a response among each other includes allocating transmission by setting an identifier of a child station permitted to transmit and informing the child station permitted sequentially by the parent station, monitoring a response of the child station for a first period by a first timer after permitting the child station to transmit, and updating the child station permitted by permitting a next child station unless receiving a response from the child station permitted to communicate within the first period.

According to another aspect of this invention, a computer-readable storage medium having a computer program for a communication method in a system having a parent station and a plurality of child stations connected only to the parent station, which is unable to detect a response among each other, includes a code segment for allocating transmission by setting an identifier of a child station permitted to transmit and informing the child station permitted sequentially by the parent station, a code segment for monitoring a response of the child station for a first period by a first timer after permitting the child station to transmit, a code segment for updating the child station permitted by permitting a next child station unless receiving a response from the child station permitted to communicate within the first period, a code segment for monitoring a response of the next child station for a second period by a second timer in the parent station, and a code segment for updating the child station permitted unless receiving a response from the child station permitted to communicate within the second period.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 7 illustrates an example of a transmission allocation table in Embodiment 1;

FIG. 8 shows a configuration chart of the PON system in Embodiment 2 of this invention;

FIG. 9 illustrates an example of the transmission allocation table in Embodiment 4;

FIG. 10 illustrates another example of the transmission allocation table in Embodiment 4;

FIG. 11 illustrates another example of the transmission allocation table in Embodiment 4.

DETAILED DESCRIPTION OF THE PREFERRED EMBODIMENTS

Embodiment 1.

A system configuration and operations in Embodiment 1 of this invention are explained.

Figure 1:
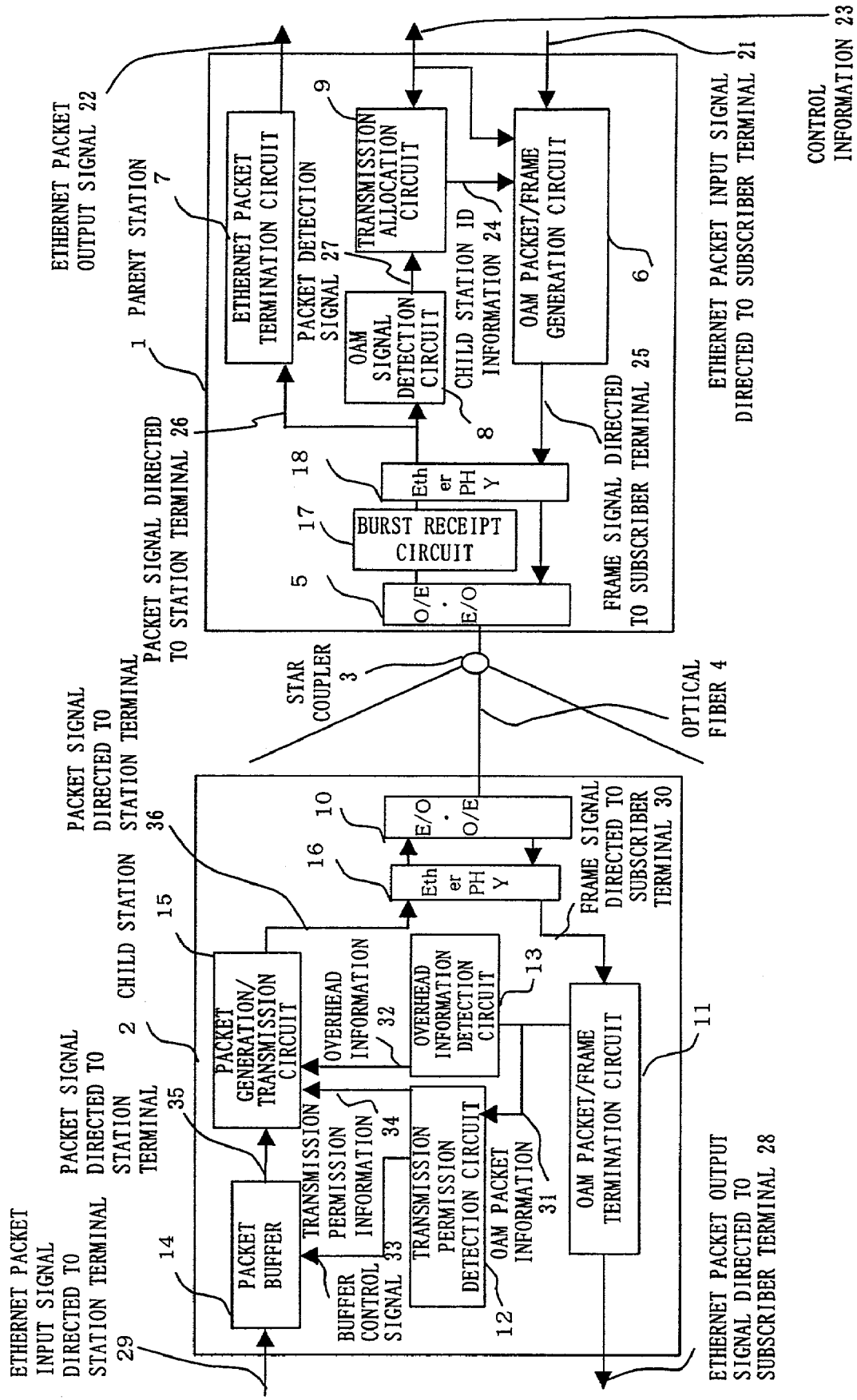
FIG. 1 shows a configuration chart of a PON system in Embodiment 1 of this invention.

FIG. 1 shows a function configuration chart of the PON system which manages variable length ETHERNET packet for explaining the operations of this invention.

In FIG. 1, a parent station 1, a child station 2, a star coupler 3 for connecting one parent station to a plurality of child stations by optical fibers, and an optical fiber 4 are illustrated.

In the parent station 1, an O/E·E/O (Optical/Electrical·Electrical/Optical) circuit 5 for converting an output electric signal to an optical signal and converting an input optical signal to an electric signal, a burst receipt circuit 17 for receiving a burst signal and interpolating a no signal period, an ETHERNET PHY (ETHERNET Physical Layer) processing circuit 18 for terminating a physical layer of an ETHERNET signal, an OAM (Operation Administration and Maintenance) packet/frame generation circuit 6 for generating a frame signal including an OAM packet directed to the subscriber equipment, an ETHERNET packet termination circuit 7 for terminating a packet signal sent from the child station, and a signal detection circuit 8 for detecting an OAM packet signal received from the child station are illustrated. Further, a transmission allocation circuit 9 permits an arbitrary child station to transmit the packet directed to the station equipment by setting an identifier (child station_ID) for specifying the child station in an area for transmission permission information in the OAM packet directed to the subscriber equipment.

In the child station 2, an O/E·E/O circuit 10 for converting an optical signal to an electric signal and converting an electric signal to an optical signal, an ETHERNET PHY processing circuit 16 for terminating the physical layer of the ETHERNET signal, an OAM packet/frame termination circuit 11 for terminating a frame signal including an OAM packet directed to the subscriber equipment, a transmission permission detection circuit 12 for comparing the identifier (child station_ID) for specifying the child station set in the area for the transmission permission information in the OAM packet directed to the subscriber equipment with an identifier (child station_ID) maintained by the own station, an overhead information detection circuit 13 for detecting overhead information in the OAM packet directed to the subscriber equipment to be attached to a beginning of the packet directed to the station equipment, a packet·buffer 14 for storing the ETHERNET packet signal directed to the station equipment input from an outside of the child station, and a packet generation/transmission circuit 15 for attaching an overhead to the packet signal and the OAM packet directed to the station equipment based on a packet transmission permission signal, and generating a packet signal with a header directed to the station equipment are illustrated.

Figure 2:
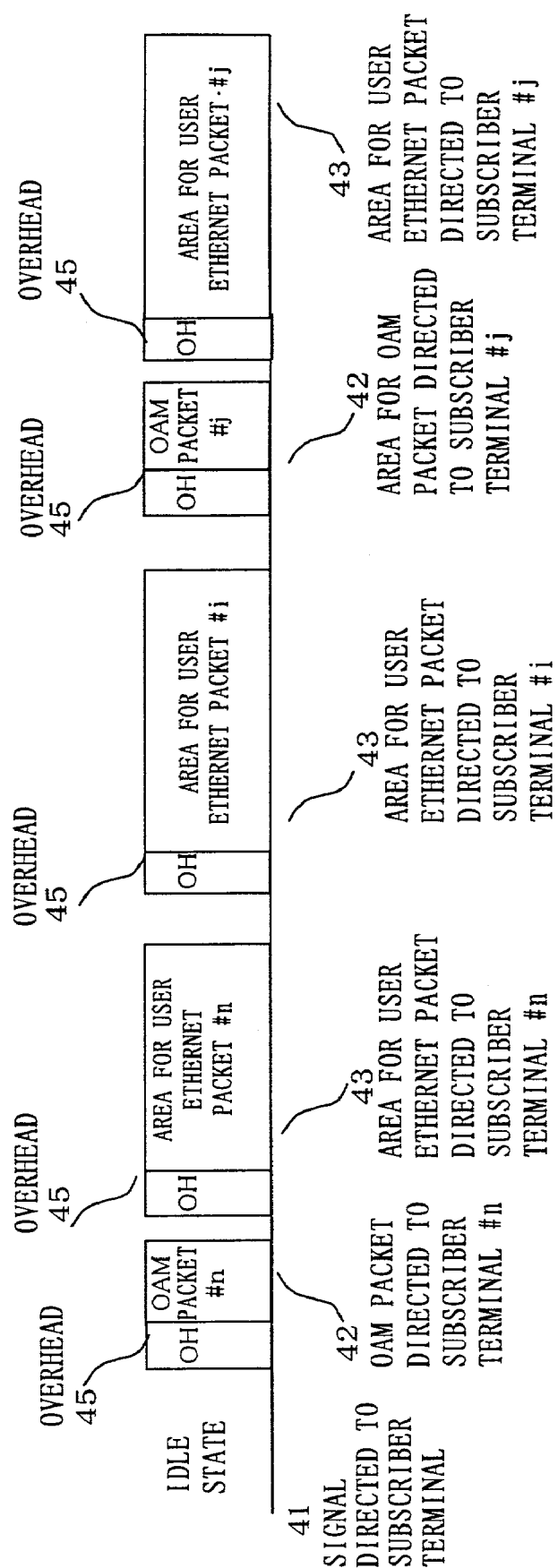
FIG. 2 illustrates a frame signal directed to the subscriber equipment in communications between the parent station and the child station in Embodiment 1.

FIG. 2 shows a configuration chart for explaining a configuration of a frame directed to the subscriber equipment in the optical fiber 4 between the parent station 1 and the child station 2 in the PON system according to this embodiment.

In FIG. 2, the frame directed to the subscriber equipment 41 repeated cyclically, an OAM packet 42 for indicating a beginning of the frame directed to the subscriber equipment, and an area for a user ETHERNET packet 43 are illustrated.

Figure 3:
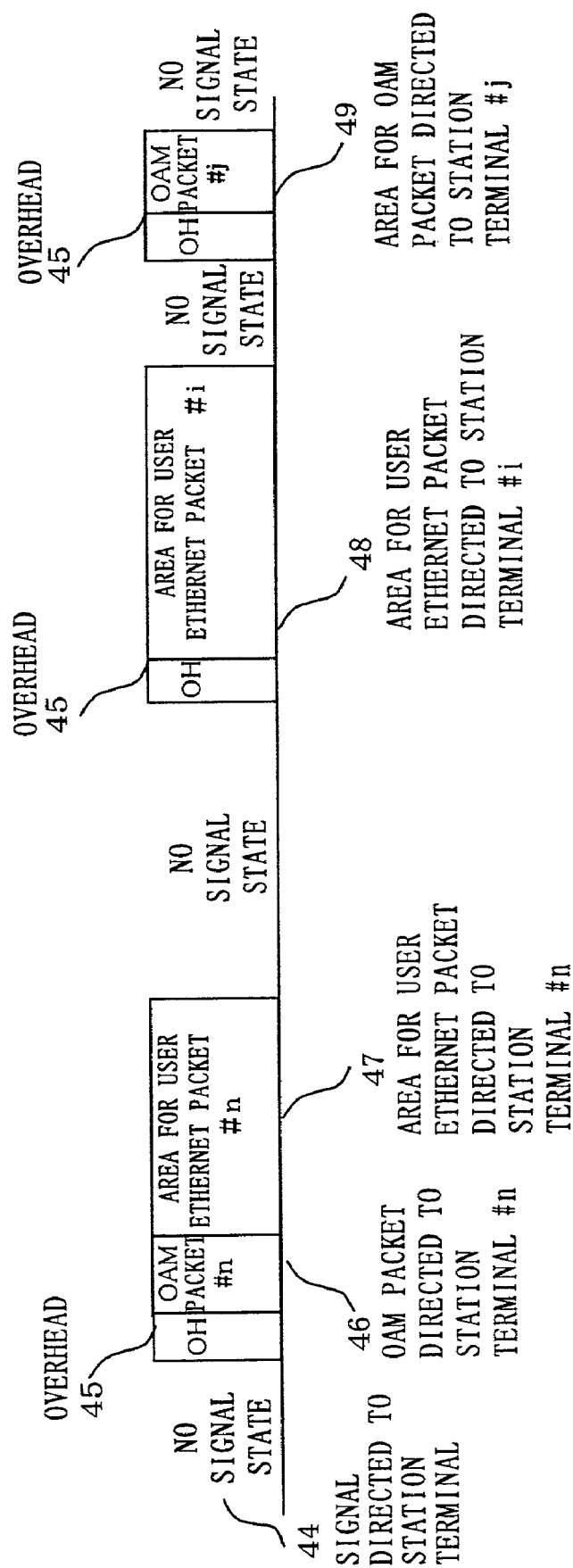
FIG. 3 illustrates a frame signal directed to the station equipment in the communications between the parent station and the child station in Embodiment 1.

FIG. 3 shows an example of an arrangement of a signal directed to the station equipment in the same optical fiber 4.

In the optical fiber 4, the packet directed to the station equipment and the frame directed to the subscriber equipment are transmitted alternately. In FIG. 3, an overhead 45 attached to a beginning of a packet signal sent from each of the child stations, an OAM packet directed to the station equipment #n 46 included in the packet signal, an area for a user ETHERNET packet directed to the station equipment #n 47 included in the packet signal, an area for a user ETHERNET packet directed to the station equipment #i 48 included in the packet signal, and an area for a user ETHERNET packet directed to the station equipment #j 49 included in the packet signal are illustrated.

Figure 4:
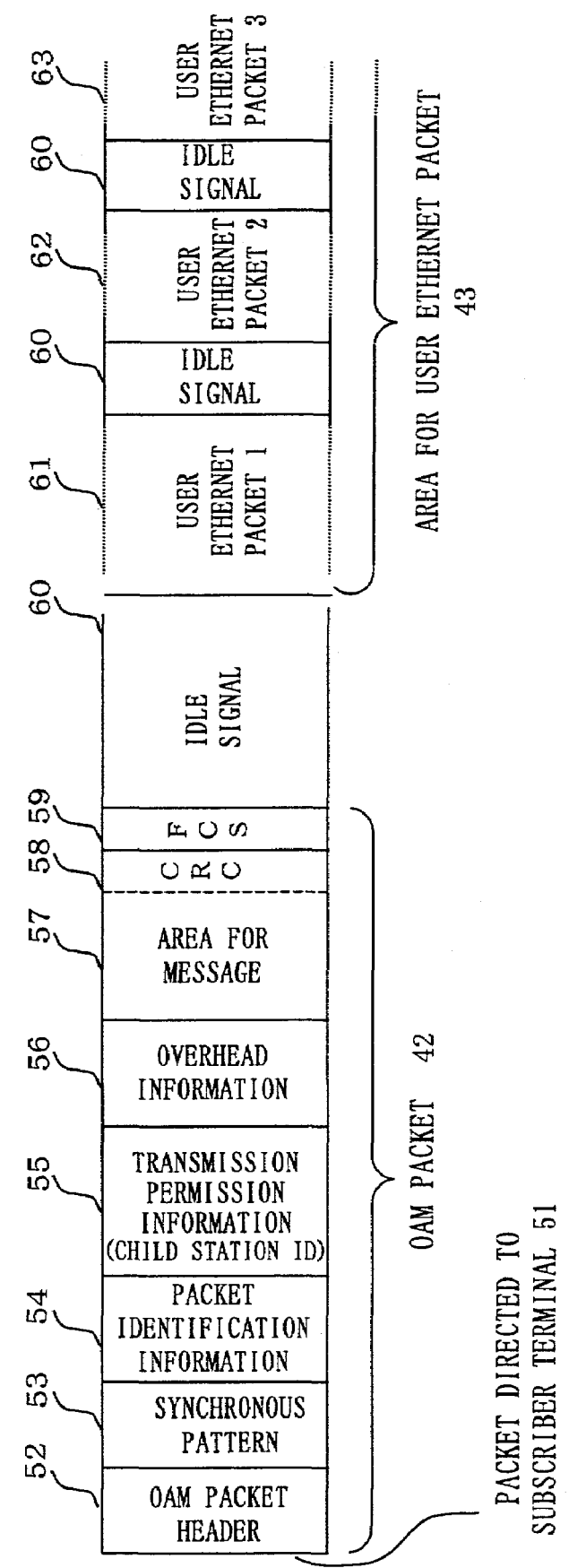
FIG. 4 illustrates details of the frame signal directed to the subscriber equipment illustrated in FIG. 2.

FIG. 4 shows a detailed configuration of the frame signal directed to the subscriber equipment illustrated in FIG. 2.

In FIG. 4, a packet signal directed to the subscriber equipment 51 is illustrated. Particularly, the OAM packet 42 includes an ETHERNET packet header 52 included in the packet signal directed to the subscriber equipment, a synchronous pattern 53 included in the packet signal, packet identification information 54 included in the packet signal, transmission permission information (child station_ID) 55 included in the packet signal, overhead information 56 included in the packet signal, an area for a message 57 included in the packet signal, a CRC (Cyclic Redundancy Check) operation result 58 for the area for the message, and FCS (Frame Check Sequence) information 59 applied in a time period between a previous OAM packet and a present OAM packet. Further, the area for the user ETHERNET packet 43 includes an idle signal 60 interpolated between the packet signals, a first user ETHERNET packet 61, a second user ETHERNET packet 62, a third user ETHERNET packet 63, etc.

Figure 5:
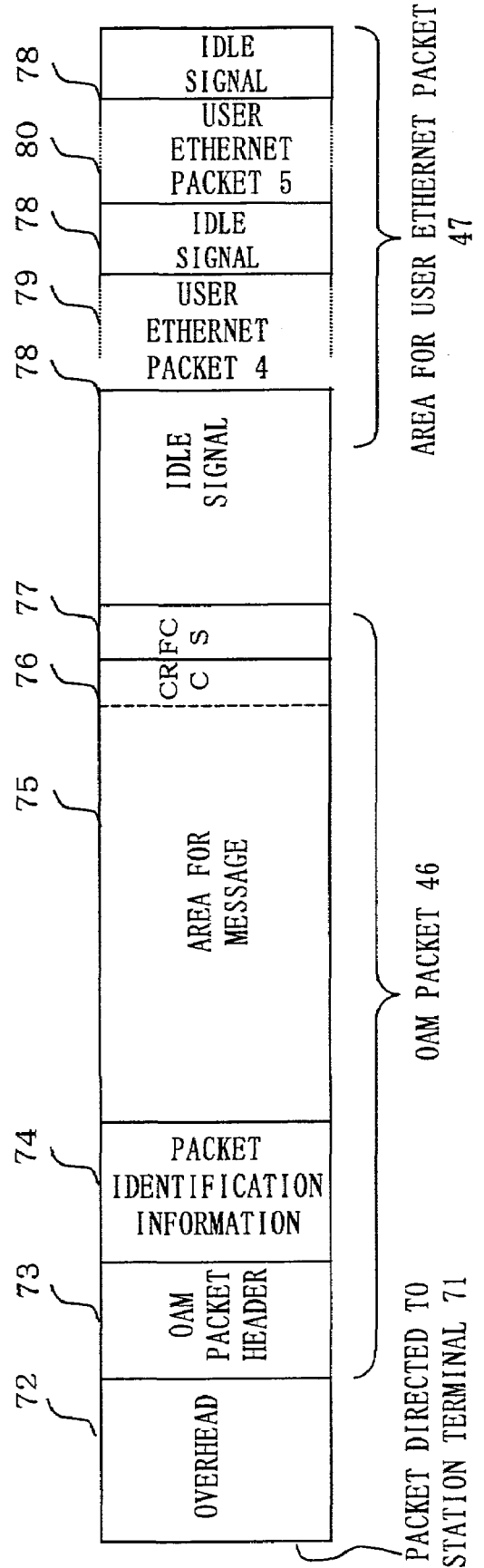
FIG. 5 illustrates details of the frame signal directed to a station equipment illustrated in FIG. 3.

FIG. 5 shows a more detailed configuration of the packet signal directed to the station equipment illustrated in FIG. 3.

In FIG. 5, a packet signal directed to the station equipment 71 includes the OAM packet directed to the station equipment and the area for the user ETHERNET packet. An overhead 72 is attached to a beginning of the packet signal directed to the station equipment. The OAM packet 46 included in the packet signal directed to the station equipment includes an ETHERNET packet header 73, packet identification information 74, an area for the message 75, a CRC operation result 76 for the area for the message, and FCS information 77 applied in a time period between a previous packet and a present packet. Further, the area for the user ETHERNET packet 47 includes an idle signal 78 interpolated between the packet signals, a fourth user ETHERNET packet 79, a fifth user ETHERNET packet 80, etc.

Figure 6:
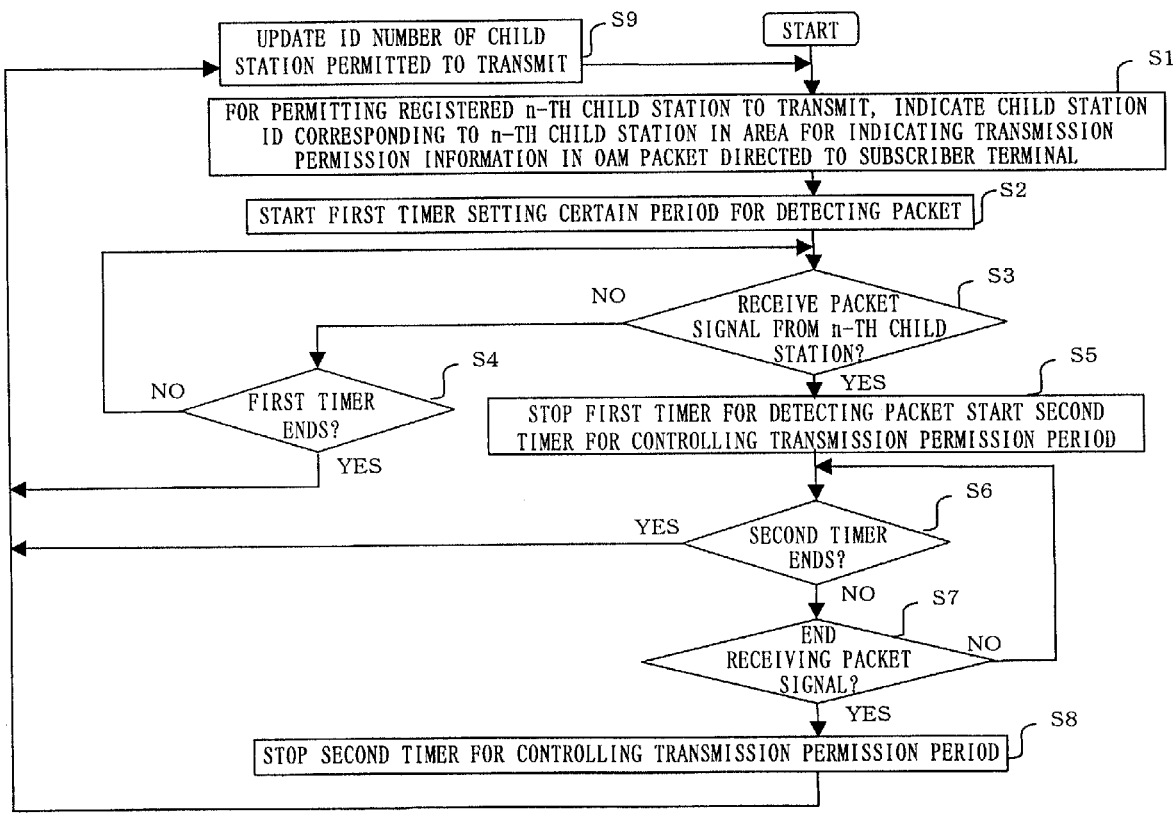
FIG. 6 shows a flow chart for explaining transmission permission allocation algorithm of a transmission permission sequential allocation controller of the parent station in Embodiment 1.
Figure 12:
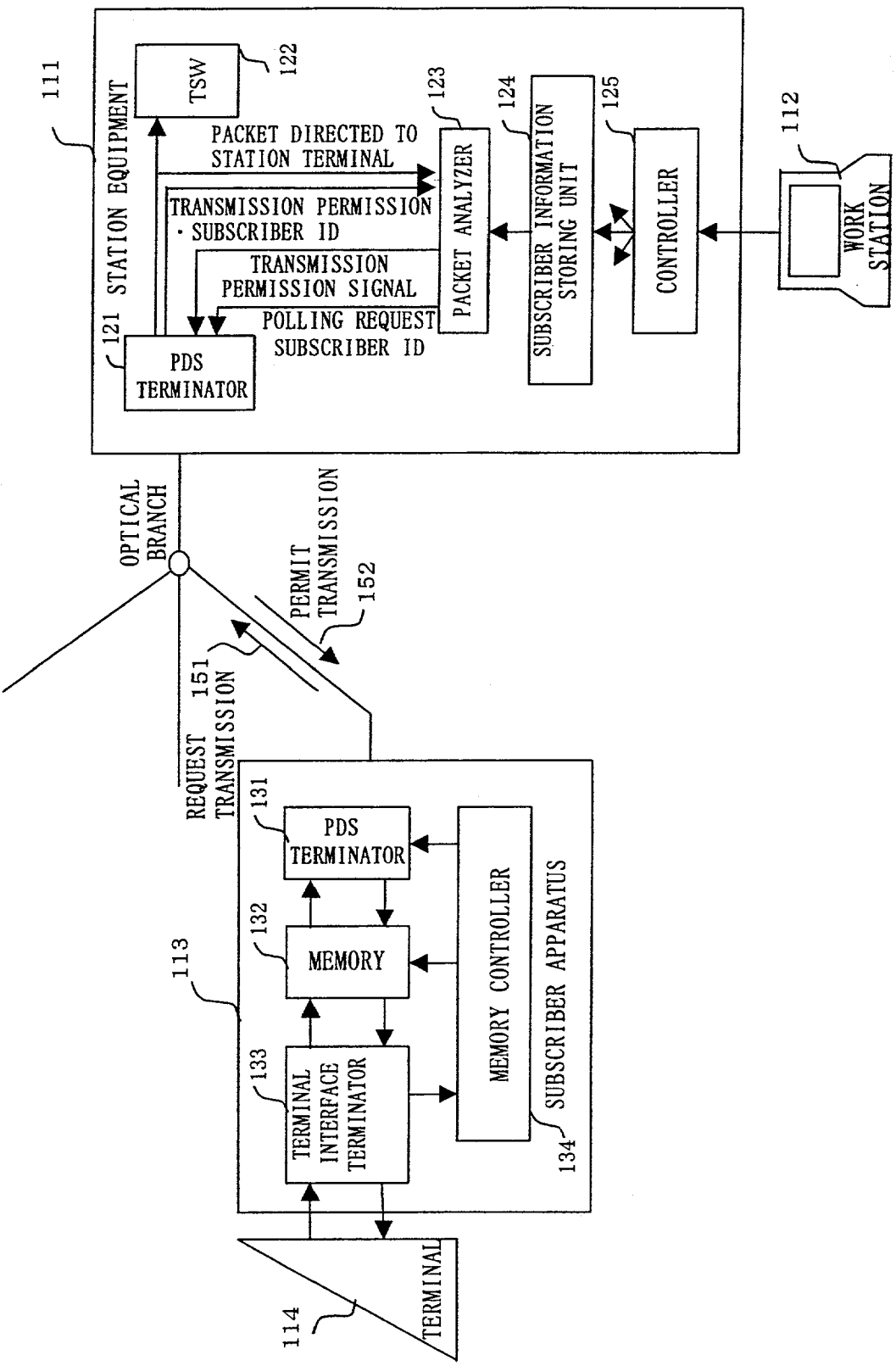
FIG. 12 shows an optical communication system according to the related art.

FIG. 6 shows a flow chart of allocation algorithm for setting the transmission permission for the plurality of child stations 2 by the parent station 1 in Embodiment 1.

In FIG. 6, a first timer and a second timer are important, but they are not illustrated in FIG. 1. The timers are provided in the transmission allocation circuit 9, for example. A transmission allocation table 9c is also prepared in the transmission allocation circuit 9.

In FIG. 6, in Step 1 (hereinafter, abbreviated as S1, etc.), for permitting the n-th child station 2 registered in the parent station to transmit, an identifier (child station ID) corresponding to the n-th child station is specified in an area for indicating a transmission permission information in the OAM packet directed to the subscriber equipment. In S2, the first timer, i.e., the first timer setting a receipt period for detecting the packet directed to the station equipment, is started at the same time with the processing in S1. In S3, the parent station waits if the packet signal directed to the station equipment is received from the n-th child station permitted to transmit by the parent station. In S4, a judgement is made if the first timer started in S2 has ended. In S5, if the parent station 1 has received the packet signal directed to the station equipment from the n-th child station 2 permitted to transmit by the parent station 1, the first timer for setting the receipt period is stopped, and a second timer, i.e., second timer for controlling a transmission permission period, is started. In S6, a judgement is made if the second timer started in S5 has ended. In S7, it is detected that the packet signal directed to the station equipment has been received from the n-th child station permitted to transmit by the parent station before the second timer started in S5 ends. In S8, the packet signal directed to the station equipment has been received from the n-th child station 2 permitted to transmit, and the second timer for controlling the transmission permission period is stopped. In S9, the parent station refers to the transmission allocation table 9c, and changes the child station permitted to transmit from the n-th child station to another child station.

With reference to FIG. 6, operations by the parent station 1 of setting the transmission permission sequentially for the plurality of child stations 2 are explained.

The parent station 1 sets an identifier (child station_ID) for specifying the child station in the area for the transmission permission information in the OAM packet directed to the subscriber equipment for permitting the n-th child station among the plurality of registered child stations (S1). At the same time, the parent station starts the first timer, i.e., first timer setting the period for detecting a response packet (S2). A timer value of the first timer is a period set arbitrarily in considering a delay in a loop of a transmission line between the parent station 1 and the child station 2 in PON.

The n-th child station 2 detects the identifier (child station_ID) in the area for the transmission permission information in the OAM packet directed to the subscriber equipment, and compares the identifier with the identifier maintained by the own station. If the identifiers are matched, it is judged that the transmission is permitted, and the packet signal directed to the station equipment is sent. The parent station waits if the packet signal directed to the station equipment is received from the n-th child station before the first timer detects the end of the period (S3). When the parent station detects that the first timer has ended before the packet signal is received from the child station, the parent station changes the child station permitted to transmit to a next child station (S9).

When the parent station receives the packet signal from the child station permitted to transmit before the first timer ends, the parent station stops the first timer for continuing to permit the child station to transmit. At the same time, the second timer, i.e., the second timer for controlling the transmission permission period, is started (S5). A timer value for the second timer is set to limit a transmission permission period for a respective child station. For assuring each of the child stations of a respective band (band period) for transmission directed to the station equipment, the parent station can set the value arbitrarily in considering a total number of the child stations and a content of service of each of the child stations 2 registered in the parent station 1. While the parent station is receiving the packet signal from the child station permitted to permit, the parent station monitors if the second timer ends (S6) and if the packet signal has been received from the child station (S7). When the parent station detects that the second timer has ended while the packet signal is being received from the child station permitted to transmit, it is judged that a maximum time period allocated to the child station is exceeded. In that case, for terminating the transmission permission for the n-th child station, the child station permitted to transmit is changed from the n-th child station to a next child station (S9).

When it is detected that the packet signal has been received from the child station permitted to transmit, the second timer is stopped (S8). Then, the child station permitted to transmit is changed from the n-th child station to another child station (S9). For specifying the child station permitted to transmit, a child station data transmission allocation table as illustrated in FIG. 7 is prepared, and a transmission right is allocated sequentially.

Overhead information is explained more in detailed.

In the PON system configured as illustrated in FIG. 1, the OAM packet of the packet signal directed to the subscriber equipment 51 as illustrated in FIG. 4 includes an area for indicating the overhead information 56. Further, at a beginning of the packet signal 71 directed to the station equipment as illustrated in FIG. 5, there is an area for the overhead 72.

For stabilizing operations of an optical receiver of the parent station, a certain length of an area for the overhead must be specified in the overhead information of the OAM packet in FIG. 4, and in the overhead attached to the beginning of the packet directed to the station equipment in FIG. 5. When the optical receiver of the parent station receives the packet signal directed to the station equipment from the child station, the optical receiver controls a gain of the optical receiver at first as a level of the optical signal differs due to a difference in a length of an optical fiber from the parent station to each of the child stations. After the gain is stabilized, the packet signal directed to the station equipment is regenerated as an electric signal. In a transition time period till the gain of the optical receiver is stabilized, the beginning of the packet signal directed to the station equipment is not regenerated, or an uncertain signal is generated. Therefore, an overhead corresponding to the time period till the gain of the optical receiver is stabilized is provided at the beginning of the packet signal directed to the station equipment.

The parent station 1 provides an arbitrary header length information directed to the subscriber equipment for attaching to the beginning of the packet signal directed to the station equipment in the OAM packet, and the child station 2 sends the packet signal directed to the station equipment with a header of a length corresponding to the header length information. Further, also when time for stabilizing the gain of the optical receiver in the parent station differs, the header information corresponding to the time is changed and provided in the OAM packet such as OAM packet 42 directed to the subscriber equipment. Accordingly, the packet signal directed to the station equipment with a header in an arbitrary length can be sent to the parent station from the child station 2.

As stated, according to this invention, the parent station sets the identifier and sends the permission for communication to the child station permitted to communicate in a first period. If there is no response within the time period, the parent station permits the next child station to communicate.

Therefore, in simple controlling, the parent station can send the permission for communication to the child stations sequentially and communicate with the child stations.

Embodiment 2.

A system in which one parent station controls a plurality of child stations which have various communication speeds is explained.

FIG. 8 shows a configuration of the parent station in the packet communication system for managing the various communication speeds in this embodiment.

In FIG. 8, a parent station 81, a respective speed buffer 84 for storing the ETHERNET packet signal from an interface which has a various communication speed, and an OAM packet/frame generation circuit 85 for generating a respective speed OAM signal directed to the subscriber equipment by managing a various speed are illustrated. The parent station 81 reads the ETHERNET packet signal in a constant signal speed from the respective speed buffer 84 for storing the packet signal directed to the subscriber equipment based on the respective signal transmission speed. Then, an identifier (child station ID) for specifying the child station is set in the area for the transmission permission information in the OAM packet in the packet signal directed to the subscriber equipment for permitting a child station. In this case, the child station has an arbitrary communication speed among registered child stations which have various communication speeds. Then, the packet signal directed to the subscriber equipment including the OAM packet with the overhead information and the user ETHERNET packet signal is sent to the child station. The child station extracts the transmission permission information in the OAM packet. When the child station confirms that the information is matched, the child station sends the packet signal directed to the station equipment to the parent station.

For assuring the child stations which have various communication speeds of bands (band periods) or communications in a determined amount, the parent station 1 sets the second timer and specifies information in the area for indicating the transmission permission information in considering the communication speeds.

As stated, since the parent station includes the respective speed buffer 84 for storing the packet signal directed to the subscriber equipment based on a respective signal transmission speed, a packet communication system including a plurality of child stations which have various signal transmission speeds can be realized in this embodiment. Accordingly, work, e.g., moving the network, etc. due to an increase in a transmission capacity of the child station becomes unnecessary.

Further, the time period for communicating with the child station can be determined respectively based on a various communication speed in communications with an outside of the system. Therefore, even if there is a plurality of child stations which have various communication speeds in the system, the system configuration can be simplified.

Embodiment 3.

In the PON system explained in each of the above-stated embodiments, child station_ID is used to identify the child station. As illustrated in FIG. 4, the child station is identified by setting child station_ID in the user ETHERNET packet as communication permission information. By corresponding VLANtag (Virtual LAN tag), MAC (Medium Access Control) address, IP (Internet Protocol) address, and MPLS Multi Protocol Label Switching) label to child station_ID as identification information, the ETHERNET signal and the network can be harmonized.

As an actual configuration, a function for corresponding a destination address in a user packet to the MAC address, the IP address, the MPLS label, and ID of the child station is provided and a correspondence table is prepared to store the relationship in the OAM packet/frame generation circuit 6 in the parent station 1 and the overhead information detection circuit 13 in the child station. The packet is the ETHERNET packet in VLAN (Virtual LAN). When a packet in which the DA (destination address) and VID (identifier of the above VLAN) is described in a frame with a tag is received, the parent station specifies the child station based on the DA and the VID in the VLAN stored in the table. A SA (source address) in the user packet received from the child station is corresponded to the identifier of the child station in the parent station, and stored. For transmission to the child station, the DA in the packet is compared with the SA stored, and the child station to which the transmission is directed is specified.

Further, since information in the user packet is used for identifying the child station, it is easy to connect to an upper network layer.

Embodiment 4.

A configuration for allocating a transmission period or a band period to a child station which has high priority transmission data or transmission data in a large amount is explained.

In the PON system explained in Embodiment 1, the transmission right is allocated to the child station sequentially based on the child station data transmission allocation table as illustrated in FIG. 7. However, as illustrated in FIG. 9, by providing a minimum band assurance area and a best effort area in the child station data transmission allocation table, a minimum transmission band period can be assured for the signal directed to the station equipment sent from each of the child stations.

Further, in the best effort area, a transmission right is allocated again only to a child station which sent a user packet when the transmission right was allocated to the child station before. Accordingly, it is possible to give the priority to the allocation of the band period to the child station which wants to transmit the data in a large amount. Hence, the transmission band period for the child station can be utilized more effectively.

Allocation of the band period to each of the child stations which have various service grades is explained.

For example, when the child stations have various service grades, an equal service grade area and a high speed service grade area are provided in the child station data transmission allocation table as illustrated in FIG. 10.

Accordingly, the transmission band period can be allocated to the signal directed to the station equipment individually for each of the child stations.

Similarly, when the child station maintains a high priority packet and a low priority packet, a high priority packet transmission area and a high and low priority packet transmission area (both packet transmission area) are provided in the child station data transmission allocation table. The priority is given to the transmission of the high priority packet. Transmission of the low priority packet is permitted after the high priority packet has been sent. Accordingly, it is possible to control the priority in the transmission of the signal from the child station. By controlling the priority in this way, emergency data can be sent in a time band in which a particular child station is not specified for sending emergency data, e.g., power down of an electric source, etc. which must be sent urgently besides regular communications. Further, by controlling the priority in this way, it is possible to send the emergency data by providing the time band for emergency communications for each of the child stations operating. By controlling the priority, it is possible to give the priority to the emergency data, e.g., power down of the electric source, etc. which must be sent urgently. Further, the areas of the table are determined and updated regularly based on actual usage conditions.

Further, the band period is allocated to the transmission based on the transmission allocation table. Therefore, it is possible to control the allocation, e.g., band assurance, priority allocation, respective speed allocation, allocation based on the actual usage condition, etc. to the child stations flexibly.

Embodiment 5.

In each of the above embodiments, a specialized hardware element is provided for configuring the system. However, since micro processors and control program technique have been developed and improved, it is not difficult to configure a similar element by using a firmware stored in ROM (Read Only Memory) in which the control program is loaded and combining with a general micro processor.

In this embodiment, a flow of operations illustrated in FIG. 6 is stored in a computer-readable medium as a firmware or program, which is not illustrated. It is also possible that the general computer reads from the stored medium for configuring characteristic elements illustrated in FIG. 1 in the computer and performing the operations illustrated in FIG. 6.

In all the above embodiments, the PON system was explained. However, this invention is not limited to the PON system. This invention can be applied to any transmission method for performing packet communications. Further, the transmission line is not limited to the optical fiber. The transmission can be a private line, etc. as far as the packet can be sent.

In this specifications, "store" and "indicate" means storing in the storing medium.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A packet communication system having a parent station and a plurality of child stations connected only to the parent station, the parent station comprising:

a first timer configured to monitor a first period, which is a response detection period in the parent station;

a transmission allocation device configured to allocate to a first child station a first transmission permission right to transmit a first packet to the parent station, the first transmission permission right set in a permission racket including a transmission permission identifier of the first child station and said permission packet is transmitted to the first child without first polling the first child station; and the transmission allocation device configured to sequentially allocate to a second child station, without first polling the second child station, a second transmission permission right to transmit a second packet to the parent station at the end of the first period, in the case that reception of the first packet from the first child station is not started during the first period, wherein the parent station distinguishes a child station from which a transmission is received based on a corresponding transmission permission right which was allocated during a time period in which the transmission was received.

2. The packet communication system of claim 1, further comprising:

a second timer configured to monitor a second period, when reception of the first packet from the first child station is started during the first period, the second period being transmission permission period in the parent station, and the transmission allocation device is further configured to sequentially allocate to the second child station, without first polling the second child station, the second transmission permission right to transmit the second packet in the case that reception of the first packet from the first child station is not completed during the second period.

3. The packet communication system of claim 2, further comprising:
a respective speed buffer configured to store data received from an external interface connected to channels corresponding to the child stations; and
a packet/frame generation device connected to the respective speed buffer, wherein the parent station sets a length of the second period based on a speed of the transmission of the child station.

4. The packet communication system of claim 1, wherein the transmission allocation device of the parent station includes an OAM (Operation Administration and Maintenance) generation device configured to provide the corresponding transmission permission right of the child station in an OAM packet.

5. The packet communication system of claim 4, further comprising:
an OAM packet/frame generation device configured to extract predetermined information from a user packet in the parent station; and
an overhead detection device in the child station configured to detect the corresponding transmission permission right of the child station by referring to an overhead of the OAM packet sent from the parent station.

6. The packet communication system of claim 1, further comprising:
a transmission allocation table in the parent station for being referred to for allocating the corresponding transmission permission right to the child station, which has one of priority data and high speed transmission data.

7. The packet communication system of claim 6, wherein the parent station increases a frequency of allocation of transmission permission rights to the child station, which has responded to the corresponding transmission permission right, when the transmission allocation table is updated.

8. The packet communication system of claim 1, wherein the parent station provides an emergency period except for non-emergency transmissions and sends emergency data besides regular allocation to at least one child station in the emergency period.

9. A packet communication method in a system having a parent station and a plurality of child stations connected only to the parent station, the method comprising:
allocating to a first child station a first transmission permission right to transmit a first packet to the parent station by setting in a first permission packet a first transmission permission identifier of the first child station;
sending the first permission packet including the first transmission permission identifier to the first child station, without first polling the first child station;
monitoring reception of the first packet from the first child station for a first period after sending the first permission packet, the parent station distinguishing a child station from which a transmission is received based on a corresponding transmission permission right which is allocated during a time period in which the transmission is received; and
sequentially assigning a second transmission permission right to a second child station after the first period without first polling the second child station, by sequentially sending a second permission packet including a second transmission permission identifier to the second child stations, in case the reception of the first packet from the first child station is not started during the first period.

10. The packet communication method of claim 9, further comprising:
monitoring the first packet from the first child station for a second period, which is a transmission permission period in the parent station, when the reception of the first racket is started during the first period; and
sequentially allocating to the second child station, without first polling the second child station, the second transmission permission right to transmit the second packet in the case that reception of the first packet from the first child station is not completed during the second period.

11. The packet communication method of claim 10, further comprising:
storing data received via an external interface from channels corresponding to each of the child stations in a respective speed buffer in the parent station; and
setting a length of the second period based on a respective speed the transmission of the child station.

12. The packet communication method of claim 9, further comprising:
storing the corresponding transmission permission right of the child station, which has one of priority data and high speed transmission data in a transmission allocation table provided in the parent station.

13. The packet communication method of claim 9, further comprising:
sending emergency data besides regular allocation to at least one child station in an emergency period provided by the parent station except for non-emergency transmissions.

14. A computer-readable storage medium encoded with computer instructions for communication in a system having a parent station and a plurality of child stations connected only to the parent station, the instructions when executed resulting in performance of steps comprising:
allocating to a first child station a first transmission permission right to transmit a first packet to the parent station by setting in a first permission packet a first transmission permission identifier of the first child station;
sending the first permission packet including the first transmission permission identifier to the first child station, without first polling the first child station;
monitoring a reception of the first packet from the first child station for a first period, after sending the permission packet, the parent station distinguishing a child station from which a transmission is received based on a corresponding transmission permission right which is allocated during a time period in which the transmission is received; and
sequentially assigning a second transmission permission right to a second child station after the first period without first polling the second child station, by sequentially sending a second permission packet including a second transmission permission identifier to the second child station, in the case the reception of the first packet from the first child station is not started during the first period.

15. The storage medium of claim 14, wherein the instructions when executed result in performance of further steps comprising:
monitoring the first packet from the first child station for a second period, which is a transmission permission period in the parent station, when the reception of the first packet is started during the first period.

16. The storage medium of claim 14, wherein the instructions when executed result in performance of further steps comprising:

monitoring the first packet from the first child station for a second period, which is a transmission permission period in the parent station, when the reception of the first packet is started during the first period; and sequentially allocating to the second child station, without first polling the second child station, the second transmission permission right to transmit the second packet in the case that reception of the first packet from the first child station is not completed during the second period.

17. The storage medium of claim 16, wherein the instructions when executed result in performance of further steps comprising:

storing data received via an external interface from channels corresponding to each of the child stations in a respective speed buffer in the parent station; and setting a length of the second period based on a respective speed of the transmission of the child station.

18. The storage medium of claim 14, wherein the instructions when executed result in performance of further steps comprising:

storing the corresponding transmission permission right of the child station, which has one of priority data and high speed transmission data, in a transmission allocation table provided in the parent station.

19. The storage medium of claim 14, wherein the instructions when executed result in performance of further steps comprising:

sending emergency data besides regular allocation to at least one child station in an emergency period provided by the parent station except for non-emergency transmissions.

* * * * *